United States Patent [19]
Hackett et al.

[11] Patent Number: 4,849,972
[45] Date of Patent: Jul. 18, 1989

[54] DIGITAL DATA COMMUNICATIONS TERMINAL AND MODULES THEREFOR

[75] Inventors: Robert R. Hackett, Whitehouse Station; Gregory S. Kenepp, Bridgewater; Michael M. Luniewicz, Whitehouse Station; Martin L. Swim, Morristown, all of N.J.

[73] Assignee: Integrated Network Corporation, Bridgewater, N.J.

[21] Appl. No.: 80,628

[22] Filed: Jul. 31, 1987

[51] Int. Cl.$^4$ .............................................. H04J 3/12
[52] U.S. Cl. ................................................. 370/110.1
[58] Field of Search .............................. 370/110.1, 114

[56] References Cited

U.S. PATENT DOCUMENTS

4,627,047 12/1986 Pitroda et al. ................... 370/110.1
4,636,584 1/1987 Binkerd et al. ................... 370/110.1

Primary Examiner—Benedict V. Safourek
Assistant Examiner—Wellington Chin
Attorney, Agent, or Firm—Hamilton, Brook, Smith & Reynolds

[57] ABSTRACT

A line interface module and selected channel unit modules are replaced in a digital terminal which couples time multiplexed digital communications lines to a plurality of voice signal lines. The line interface unit is provided with means for responding to a controller to insert PCM data into selected time slots of the PCM signal on the digital line and to latch data received on the line. In addition to receiving pulse amplitude modulated signals from a receive unit in the terminal, voice channel units may also receive the PCM code. A state machine in the channel unit recognizes control sequences of insert data. By means of the insert data, the controller may direct provisioning of the channel unit with such adjustments as gain control and equalization. It may also direct the channel unit to switch to a loopback mode of operation for diagnostics. PCM corresponding to tones may also be inserted by the line interface unit to assist in diagnostics.

31 Claims, 4 Drawing Sheets

DIGITAL DATA COMMUNICATIONS TERMINAL AND MODULES THEREFOR

BACKGROUND OF THE INVENTION

Operating companies in telephone communications systems typically receive voice signals on a plurality of lines, convert those voice signals to digital data and transmit the digital data in a time multiplexed fashion over a digital communications line. At the remote end, a like terminal receives the digital data, converts the data to pulse amplitude modulated (PAM) form and distributes the PAM signals to channel units. Each channel unit corresponds to a specific time slot of the time multiplexed digital signal and a specific voice signal line and converts a PAM signal to voice.

A widely used terminal is the modular D4 terminal. In that terminal, a channel unit module is provided for each voice signal line to provide the conversion between the PAM signals and the voice signals. Other channel units within the terminal may be devoted to lines which only transmit digital data and thus do not handle voice signals. The terminal also includes receive and transmit modules which determine time slots and frames of time slots of the multiplexed digital signal. The receive units convert the digital signals to PAM signals and distribute those PAM signals to the channel units corresponding to the time slots. The transmit units convert the PAM signals to pulse code modulated (PCM) signals and multiplex those signals into their corresponding time slots.

Prior to installation, switches of the channel units of D4 terminals are set to provision the units for proper gain adjustment, equalization and other operating parameters. Cumbersome tests are then performed, and if further adjustment is required, the units must be removed for resetting of the switches. More recently, replacement terminals allow for automatic testing and setting of the channel unit switches, but replacement terminals require disruption of the existing plant and disposal of nonconforming yet operable components.

DISCLOSURE OF THE INVENTION

In accordance with the present invention, modules for existing D4 terminals and the like are provided which allow for replacement of only selected channel unit modules and common modules without massive disruption of an existing plant. Further, the modules provide for automatic testing and provisioning of channel units both at the local terminal and at remote terminals. Further, the modules provide for automatic provisioning in response to automatic tests of the network terminal equipment.

A digital terminal couples a time multiplexed digital communications line to a plurality of secondary lines including voice signal lines. The terminal includes means for defining time slots for received and transmitted digital signals on the digital line and for converting between digital signals and pulse amplitude modulated signals. A plurality of voice signal channel modules convert between pulse amplitude modulated signals in individual time slots and voice signals on the voice signal lines. The system further includes a controller for inserting digital data in selected time slots of the digital signal to control provisioning of particular parameters of channel units associated with the respective time slots. Each of plural voice signal channel modules includes a processor for receiving the digital signal which corresponds to the pulse amplitude modulated signal associated with its time slot. The processor responds to insert data in the digital signal to provision the channel unit. Preferably, the data is inserted into the digital communications line for transfer both to a local channel unit and, through the digital communications line, to a remote terminal for provisioning of remote channel units. Preferably, a single common unit serves as a PCM access device for transfers in both directions. Further, the processor of the channel unit is able to insert digital data in a corresponding time slot of the digital signal, and the controller is able to receive the data inserted by the processor of the channel module.

The PCM access device includes means for identifying frames and time slots from the digital data. It may also include means for counting errors in framing bits received in the digital signal and a frame slip alarm which responds to a cluster of errors. It may include separate transmission and receive registers for registering data transmitted from the channel units and data received from the digital communications line. Insert data may be received by the PCM access common unit from a controller through a control bus at a rate slower than the rate at which frames of time multiplexed data are transferred on the digital communications line. Other insert data may be provided separately from the control bus at the frame rate to provide test tones as insert data.

The processor of the voice signal channel module may be able to signal a transmit module such that the transmit module selects digital signals from the channel unit to be transferred to the line interface module. The processor may additionally be able to control loopback of voice signals in response to signals from the controller.

Preferably, the channel unit includes a state machine for responding only to predetermined sequences of insert data. When a channel unit is initially installed, it is preferred that it transmit a start-up code to the PCM access common unit to call on the controller for provisioning.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

Figure 1:
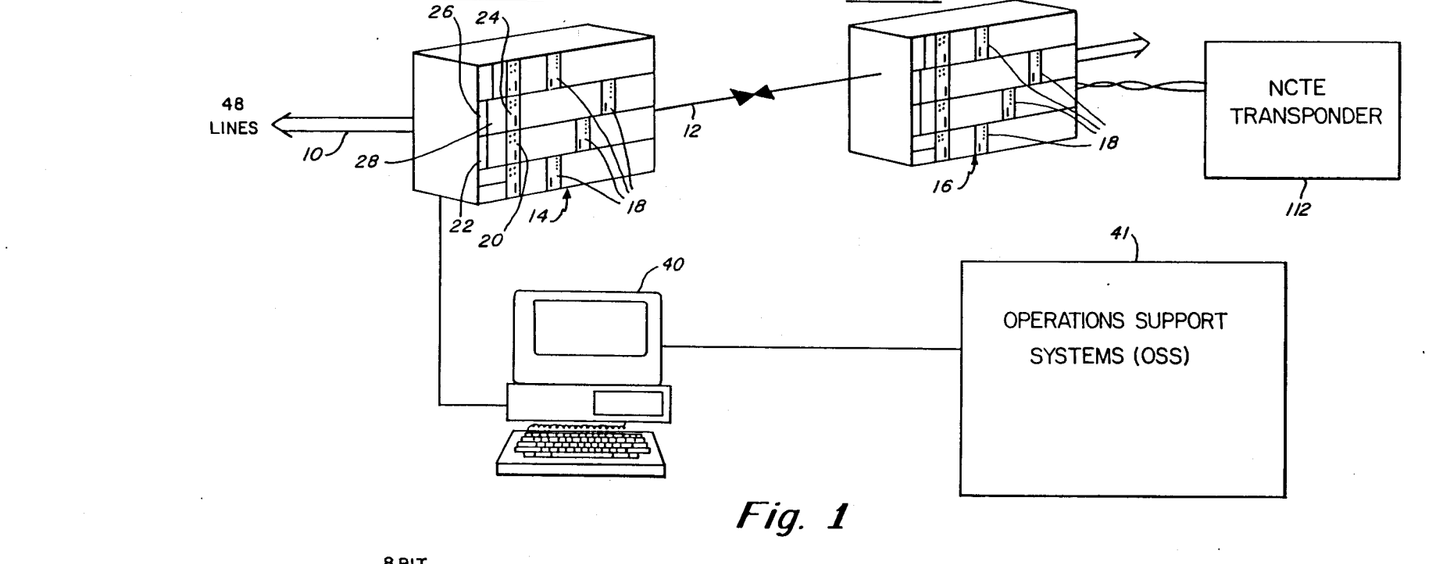
FIG. 1 illustrates a system embodying the present invention.

A telecommunications system embodying the present invention is illustrated in FIG. 1. In a typical operating company station, a number of signals on lines 10 from telephone switches are converted to pulse code modulated signals and transmitted along a time multiplexed communications line 12. Typically, voice signals from 48 lines are converted to PCM and time multiplexed in a D4 bank 14 onto one or two digital signal lines. At a remote end of the line 12, the signals are converted in a like bank 16 to voice signals and distributed to up to 48 lines. Each D4 bank includes a channel unit 18 associated with each of the voice signal lines. A set of 24 channel units from two levels of the D4 bank are coupled as a digroup to a pair of transmit and receive units 20,22 or 24,26. The receive and transmit units are coupled through a line interface unit 28 to one or two digital lines 12. For DS1 data rates of 1.5 megabits, each digroup communicates through a respective one of two lines 12. For DS1C data rates of 3.0 megabits, the PCM signals from the two digroups are multiplexed at the line interface unit onto a single line. For DS1C data rates, an additional synchronizing unit is provided between the line interface unit and the receive and transmit units.

The PCM signal on the line 12 is bipolar. The line interface unit 28 converts between bipolar and unipolar PCM. The line interface unit may also recover the clock from the PCM and may provide loopback for maintenance under manual control of switches. Further, the line interface unit selects between one of three timing options by which local timing is controlled in a free running fashion by a local crystal oscillator, by synchronization with the received digital signal in a loop timed mode or by an external standard.

Figure 2:
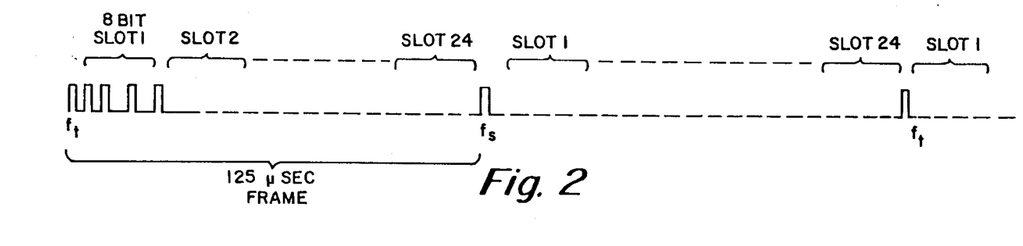
FIG. 2 illustrates a PCM signal used in the system of FIG. 1.

The receive unit responds to the incoming PCM signal received from the line interface unit to determine framing of the incoming signal and to define time slots. As illustrated in FIG. 2, the time multiplexed PCM signal is in the form of frames of 125 microseconds each. Each frame is lead by a framing bit $f_t$ or $f_s$. The framing bits follow standard patterns, and a reframer in the receive unit monitors the pattern of incoming bits to lock onto the framing bits. Each frame includes 24 time slots, in the case of a 1.5 megabit system, each associated with a channel unit and a corresponding incoming voice signal line. In each time slot, an 8-bit byte of PCM code is transmitted.

In addition to defining the frames and time slots, the receive unit converts the incoming PCM to pulse amplitude modulated (PAM) signals. For each 8-bit byte of the PCM, a single pulse is generated. The amplitude of that pulse corresponds to the incoming code and sets the amplitude of the resultant voice signal. The PAM signal from each time slot is received by a corresponding channel unit selected by the receive unit. The channel unit then filters that signal to generate the final voice signal to be transmitted on the voice signal line.

All of the above-described units are modular units which may be individually replaced in the D4 bank. When a channel unit is replaced, its analog circuitry must be set to provide processing of the voice signals suitable to the particular line to which the channel unit is coupled. To that end, test signals are transmitted through the telephone lines, and switches on conventional units are manually set to control gain, impedance, and equalization.

Recently, efforts have been made to provide systems in which the channel units may be provisioned automatically by setting the switches under microprocessor control. However, such systems have typically required replacement of an entire system or have required dedicated lines to each bank. In accordance with the present invention, automatic provisioning can be obtained in a system by changing a line interface unit in a D4 bank. Channel units are replaced only as required without modification of the existing plant, and replaced channel units can be provisioned automatically. There is no requirement for modification of the supporting plant.

Figure 3:
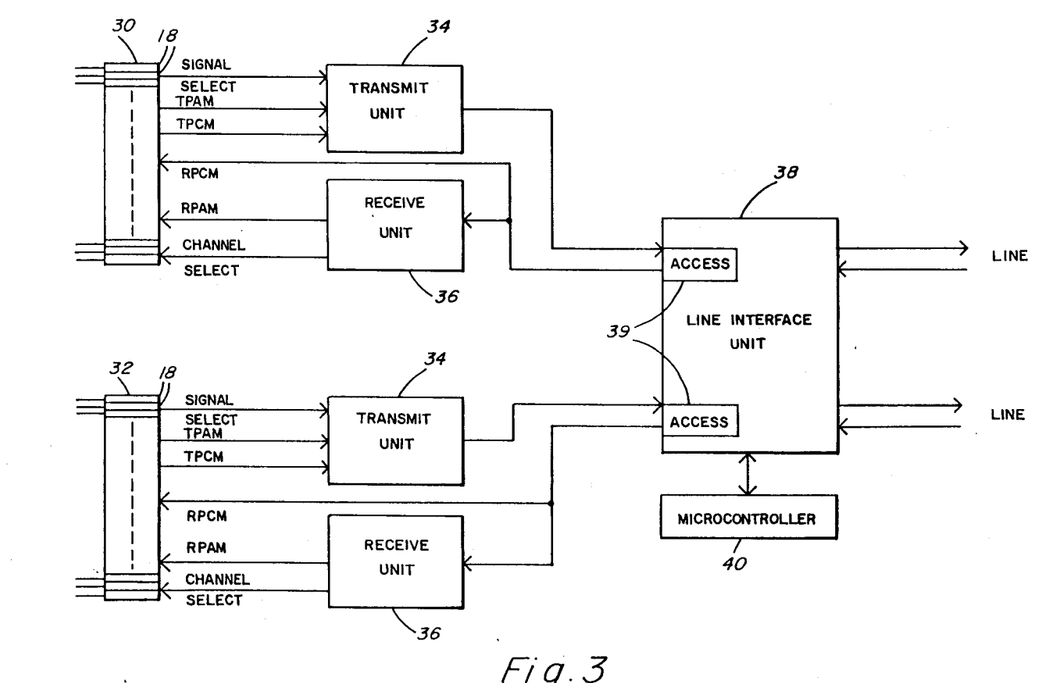
FIG. 3 is a block diagram of a terminal of FIG. 1.

FIG. 3 is a block diagram of a D4 bank embodying the present invention. As in a conventional D4 bank, two digroups 30 and 32 of modular channel units 18 are provided. All channel units of one digroup are connected along a bus on a back plate of the plant to a transmit unit 34 and receive unit 36. Similarly, the channel units of the digroup 32 are coupled to a transmit unit 34 and a receive unit 36. The receive and transmit units are all coupled through a line interface unit 38 to the one or two digital communication lines.

In accordance with the present invention, the line interface unit 38 in a system for DS1 rates or the synchronizing unit in a system for DS1C rates is a replacement module having access circuitry 39 to be described in detail below. That access circuitry is controlled by a microcontroller 40 which may communicate with an operator support system 41 (FIG. 1) over a communications link. The replacement line interface unit is compatible with existing systems. Therefore, the D4 bank may continue to operate as usual without the automatic provisioning capabilities made available by the line interface unit. The transmit and receive units are conventional and need not be replaced. To provide for automatic provisioning of a channel unit, that channel unit must be replaced. Channel units can be replaced with upgraded channel units as they fail, but an entire system need not be reconstructed at once.

Figure 4:
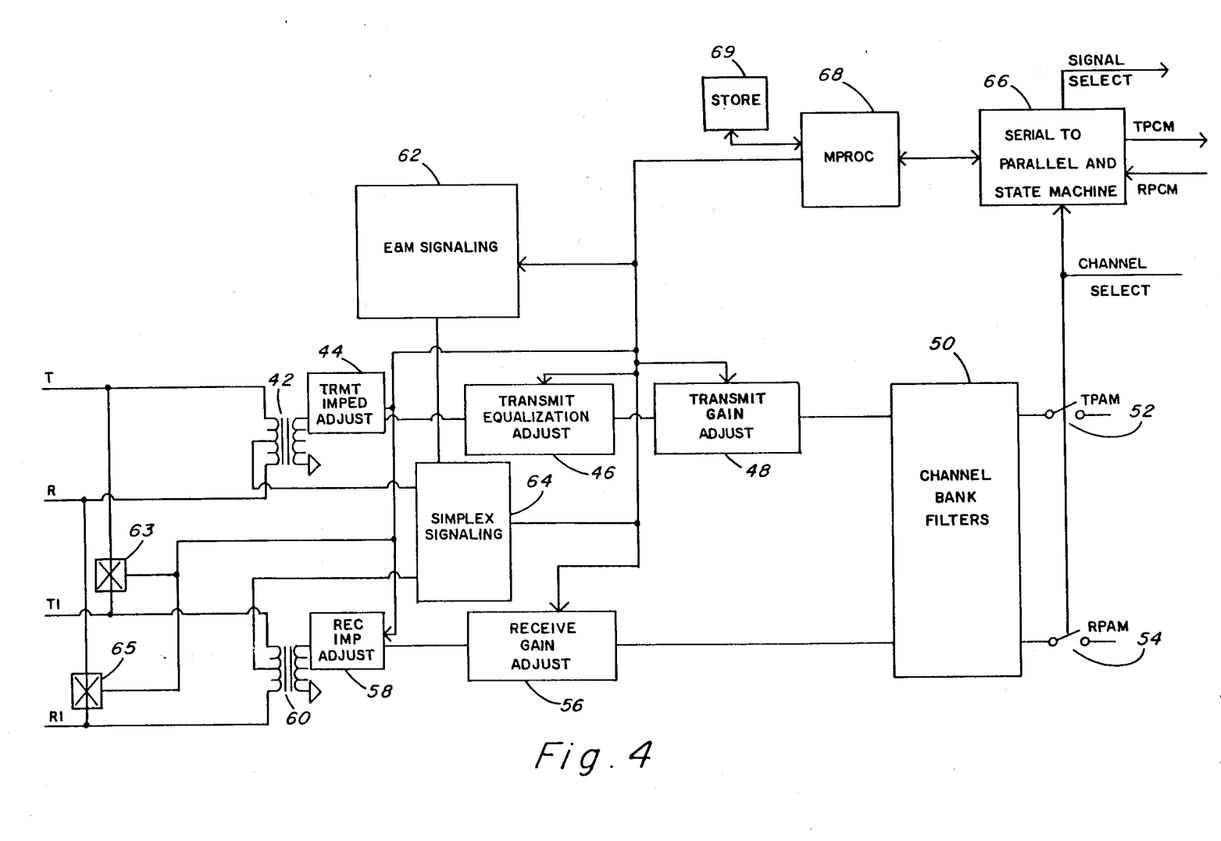
FIG. 4 is a block diagram of a channel unit of FIG. 3.

A channel unit embodying the present invention is illustrated in FIG. 4. The particular channel unit described is for a 4-wire voice signal line, but the invention can be applied to a 2-wire signal line as well. Voice signals are received on the tip and ring lines T and R for transmission through the digital line. Signals received from the digital line, on the other hand, are communicated through the tip and ring lines T1 and R1. A signal to be transmitted is passed through a transformer 42 through a transmitter impedance adjustment circuit 44. The signal is then transmitted through an equalizer 46 and a gain adjustment circuit 48 to filters 50. The voice signal output from the filters 50 is sampled by semiconductor switch 52 under control of a channel select signal from the receive unit. The signal TPAM is converted by the transmit unit 34 to PCM and is multiplexed with other signals from other channel units.

A signal RPAM from a receive unit is switched into the filters 50 by a switch 54 from its respective time slot under control of the channel select signal. With filtering, the PAM signal becomes a voice signal which is passed through a gain adjustment 56 and an impedance adjustment 58 prior to being coupled through a transformer 60 to the receive tip and ring lines T1 and R1.

Voice signal channel units typically include signaling control logic. In the present channel unit, alternative signaling control logic circuits 62 and 64 are provided to allow for alternative selection of E and M signaling and simplex signaling.

In accordance with the present invention, each of the impedance adjustments, gain adjustments, and the equalization adjustment and selection of the signaling control logic can be obtained automatically by a local microprocessor 68 which responds to data inserted at the line interface unit. The microprocessor may also control relays 63 and 65 to direct a loopback function between the transmit and receive lines.

Different types of channel units, including both voice signal units and data signal units, may be positioned at any location within a D4 bank. Therefore, D4 banks provide connections for both PAM signals for use by voice signal channel units and PCM signals directly from the line interface unit for data channel units. In a typical voice channel unit, the PCM connection is ignored. In accordance with the present invention, PAM signals are received and transmitted as before, but an additional digital circuit is provided for communication over the PCM lines. Specifically, a circuit 66 receives the serial PCM signal directly from the line interface unit and converts it to parallel form which may be communicated to the microprocessor 68.

In usual operation, the PCM signal corresponds to voice signals which are converted by the receive unit to PAM and communicated over the tip and ring lines. However, in accordance with the present invention, PCM information for controlling the microprocessor 68 may be inserted. To distinquish that insert PCM from the usual PCM of voice signals, the system 66 includes a state machine which looks for predetermined sequences of defined codes. It is extremely unlikely that random PCM corresponding to voice signals will generate a PCM sequence which is recognized by the state machine. Only once such a sequence is recognized will the data be communicated to the microprocessor for control of the channel unit as in testing and provisioning.

A nonvolatile store 69 is coupled to receive the provisioning data. That data is periodically compared with the data in the random access memory in the processor 68 as a periodic audit. In the event of a mismatch, an alarm is sent through PCM code so that the channel unit can be reprovisioned.

Both PCM data from data channel units and PAM from voice channel units must be transmitted through the transmit unit. PAM signals are there converted to PCM. To indicate to a transmit unit the character of the channel unit, a select signal is provided between the channel unit and the transmit unit. In a conventional system, the select would remain at one level for a voice signal unit and at another for a PCM unit. The present invention makes use of that signal in order to allow a channel unit to interrupt transmission of a PAM signal so that the channel unit itself may insert PCM data into the signal line through a parallel to serial converter of circuit 66. This ability to insert PCM from the channel unit without modification of the existing plant allows for bidirectional transfers between a channel unit and the microcontroller 40. In particular, when a channel unit is initially placed in a system, before establishing itself for voice communications, it signals to the microcontroller that it has been placed in service, and the microcontroller then responds by handling the necessary provisioning of the channel unit.

Figure 5:
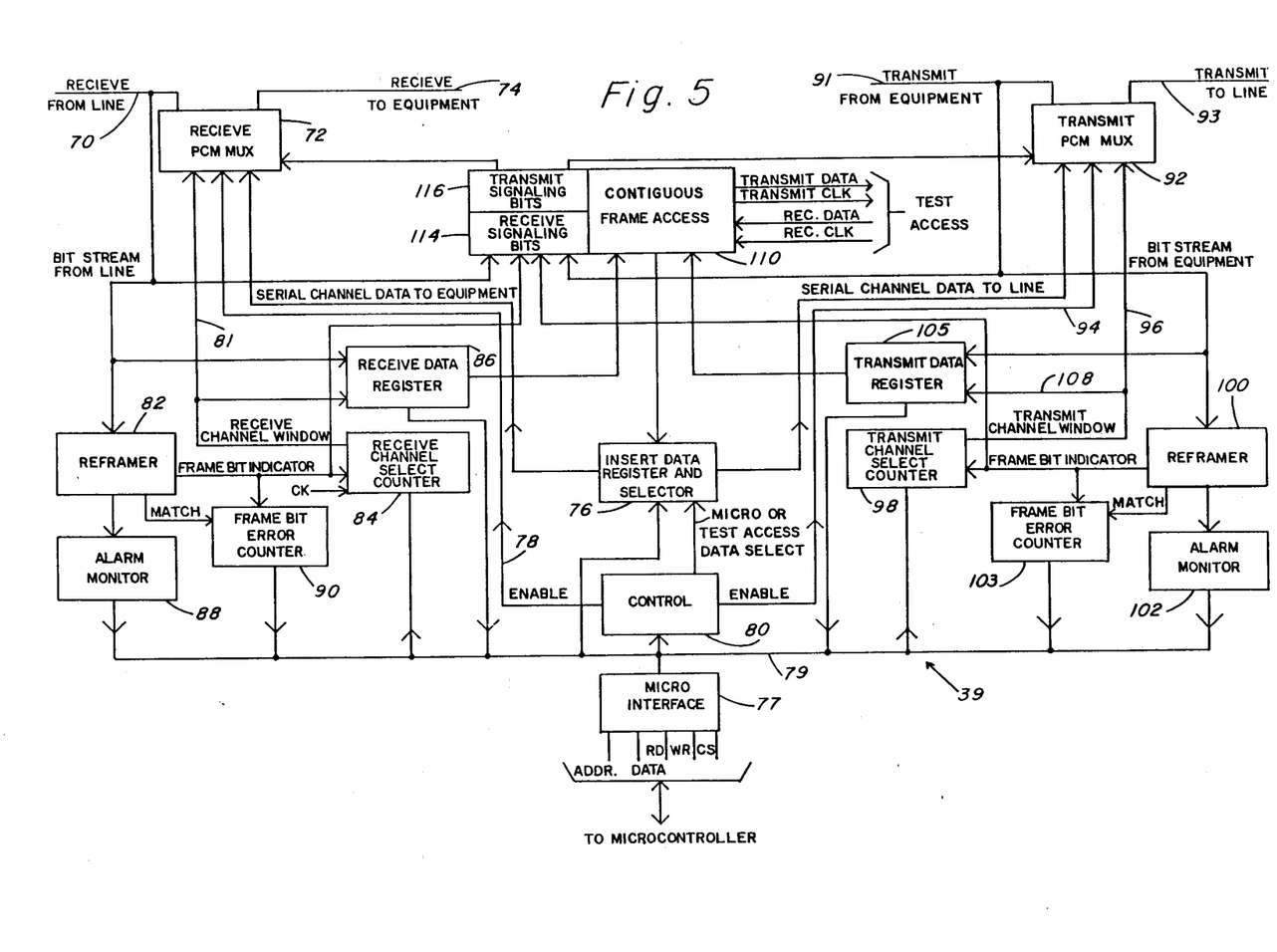
FIG. 5 is a block diagram of the line interface unit of FIG. 3.

Insertion circuitry of the line interface unit is illustrated in FIG. 5. As will be discussed, the circuit allows for insertion of data into the PCM data stream being received from the digital signal line as well as into the data stream being transmitted over the digital signal line. Also, PCM data from both the local channel units and from the digital signal line may be monitored. As a result, the microcontroller is able to both monitor and control channel units both in the local D4 bank and in remote banks. In both cases, communications are through the same signal paths over which voice PCM is transmitted. Therefore, there is no requirement for rewiring of the existing plants. Nor is there any requirement for a separate data link to remote terminals.

The insert circuitry of the line interface unit will now be described in detail with respect to FIG. 5.

PCM data on line 70 of digital line 12 is ordinarily passed directly through a receive PCM multiplexer 72 to line 74 for normal voice communications. That PCM signal is then converted to PAM and voice signals as described above. However, the multiplexer 72 also allows for the selection of insert data from an insert data register 76 to the exclusion of PCM data from the line 70. Selection of the insert data is enabled by a control signal 78 from control circuit 80 for a selected time slot corresponding in time to a window signal on line 78. The control 80 responds to digital signals on a bus 79 from the microcontroller 40 through interface 77.

Frames and time slots in the received PCM signal from line 70 are determined by a reframer 82. That reframer monitors the framing signals $f_t$ and $f_s$ of the incoming signal to lock onto the frame signals. The frame bit generated by the reframer is used to reset a receive channel select counter 84. The counter then counts clock signals generated in the line interface unit (not shown) to indicate the one of 24 time slots which is being received at any instant. The counter is programmable by the microcontroller to select a particular time slot, and when the selected time slot is reached, a window signal is asserted on line 81. If the MUX 72 has also been enabled for insertion of data, the data is then inserted from the register 76.

The window signal 81 is also applied to a receive data register 86 which allows for latching of data received from the selected time slot from line 70. The register is able to receive a byte at the 1.54 Mbit rate of line 70 and holds the byte for near the frame time of 125 microseconds. This provides a conversion to a 64 kilobit rate which can be handled by the processor 40. Thus, selection of a count by the microcontroller on counter 84 allows for selection of a time slot for either insertion of data into that time slot through MUX 72 or latching of data from the time slot into register 86.

Once the reframer 82 has locked onto the frame bits of the incoming signal, the frame bits should follow the predetermined sequence. In the event of frame slip, a cluster of bits expected by the reframer to be frame bits will not match the known pattern. An alarm monitor 88 monitors such errors, and in the event of 4 out of 9 consecutive frame bits being in error, a frame slip alarm is indicated to the microcontroller. If the microcontroller notes an out of frame condition for two seconds, trunk processing is invoked and all trunks are busied out.

An acceptably operating communications system must allow for no more than $10^{-6}$ errors per bit for data communications or $10^{-4}$ errors per bit for voice communications. Such errors can be noted in the frame bits even where there is no frame slip. To monitor the error rate of the system, a frame bit error counter 90 counts errors in frame bits and that count is read by the microcontroller.

Like circuitry is provided for latching data transmitted by the channel units and for inserting data onto the main communications line. In particular, a transmit PCM MUX 92 allows for the insertion of insert data from the data register 76. The MUX 92 selects under control of the enable signal 94 from the control 80 and the channel window signal 96 from a transmit channel select counter 98. The transmitted signal is also monitored by a reframer 100. An alarm monitor 102 and frame bit error counter 103 respond to errors noted by the reframer. Data received from the channel units may be latched into the transmit data register 105 during a time slot corresponding to the channel unit indicated by the channel window signal 108.

In operation, the microcontroller monitors signals received from the channel units and from the line by scanning through the 24 time slots and by latching the corresponding data into the receive and transmit data registers. When a channel unit is first installed, it transmits a sequence of PCM signals indicative of start-up. When the microcontroller recognizes the sequence, it causes insert data to be applied to the appropriate line 74 or 93 to signal the channel unit by PCM signals in the appropriate time slot to prepare for provisioning. The state machine of the channel unit recognizes the sequence and follows an appropriate protocol. In particular, the channel unit then transmits an ID signal which identifies the type of channeling unit. The microcontroller may then provide the appropriate provisioning data.

The microcontroller 40 is not sufficiently fast to be able to provide a new byte of insert data for each of contiguous frames. Thus, a byte of data which has been latched into the insert data register is transmitted over consecutive frames until a new byte of data is provided by the microcontroller. The state machine of the channel unit is able to ignore consecutive identical bytes and properly respond to the command sequence. However, in addition to allowing the insertion of control data from the microcontroller, it is also desirable to apply test data which may generate tones. To that end, high speed hardware may be used to generate test data which may be latched into the insert data register through a contiguous frame access circuit 110. A channel unit might initially be set for a loop back procedure by means of a code inserted into the signal line 74 or 93 from the microcontroller through the insert data register 76. Under that control code, the microprocessor 68 of a channel unit (FIG. 4) might set the relay switches 63 and 65 for loop back of a voice signal. Thereafter, a sequence of PCM code corresponding to a tone would be applied to the same time slot in contiguous frames through the insert register 76. That code would be transferred through the receive unit as would any other voice signal, be converted to PAM and be transferred through the analog circuits of the channel unit. With loop back, the signal would be transferred from the lines T1,R1 to the lines T,R and would be transmitted back to the line interface unit. The line interface unit could then receive the tone through a receive or transmit data register 86,105. The returned tone could be compared to the transmitted tone for diagnostic purposes. Thereafter, the channel unit might be re-provisioned to provide for optimum handling of the voice signals.

Tones applied to the PCM signal path through the insert register 76 may also be used in conjunction with network customer terminating equipment (NCTE). An NCTE transponder, illustrated at 112 in FIG. 1, is typically provided on a distant customer's premises. The NCTE transponder is able to provide a loop back signal. In the past, signals would be applied manually through special purpose equipment through the line to the remote NCTE transponder and the equipment would monitor the return signal. The channel unit could then be adjusted to provide for an optimum signal. With the present invention, tones can be inserted by the circuitry of FIG. 5 and forwarded to a remote NCTE transponder. Based on the return signals, a local or remote channel unit can be adjusted by control insert data to provide for optimum performance of the line to the customer.

Conventional PCM signals include a signaling bit in place of the least significant bits of the 6th and 12th frames. Signaling bits may provide for offhook and ringing conditions. Those signaling bits can be monitored by a receive signaling bits circuit 114 and, for test purposes, signaling bits can be inserted by the transmit signaling bits circuit 116.

From the above, can be seen that the present invention allows for automatic provisioning of replaced channel units without the requirement that all channel units be replaced. Both testing and provisioning of both local and remote channel units may be obtained by inserting PCM data directly into the usual PCM path. By inserting the data at the line interface unit, only the single line interface unit of a D4 bank, and not the several transmit and receive units, need be replaced to allow for the automatic testing and provisioning. Voice signal channel units transmit and receive conventional PAM signals. However, they are additionally provided with digital circuitry to respond to PCM signals, to transmit PCM signals and to modify the signal select applied to the transmit unit. This additional digital signaling and control is provided without modifying the connections to the existing plant and without interrupting the usual voice signal path.

While this invention has been particularly shown and described with references to a preferred embodiment thereof, it will be understood by those skilled in the art that various changes in form and details may be made therein without departing from the spirit and scope of the invention as defined by the appended claims.

We claim:

1. A system comprising a terminal for coupling a time multiplexed digital communications line to a plurality of secondary lines including voice signal lines, the terminal including means for defining time slots for receiving and transmitted digital signals on the digital line and for converting between digital signals and pulse amplitude modulated signals, and a plurality of voice signal channel modules for converting between pulse amplitude modulated signals in individual time slots and voice signals on the voice signal lines;

the system further comprising a controller for inserting digital insert data in selected time slots of the digital signal to set operating parameters of channel units associated with respective ones of the selected time slots; and each of plural voice signal channel modules comprising a processor for receiving the digital signal converted to the pulse amplitude modulated signal in the time slot associated with the channel module, the processor responding to insert data in the digital signal to set the operating parameters of the channel unit.

2. A system as claimed in claim 1 wherein insert data is inserted onto the digital communications line for transfer to a remote terminal for setting of operating parameters of channel modules in the remote terminal.

3. A system as claimed in claim 2 wherein a processor of a channel module is able to insert digital data on a corresponding time slot of the digital signal, and the controller is able to receive the data inserted by the processor of the channel module.

4. A system as claimed in claim 3 further comprising means in a common unit in the terminal responsive to the controller for inserting data in selected time slots, and the common unit further comprises means for identifying frames of digital data and time slots from digital data received by the common unit.

5. A system as claimed in claim 4 wherein the digital data includes framing bits, the common unit further comprising means for counting errors in framing bits received in the digital signal.

6. A system as claimed in claim 4 wherein the digital data includes framing bits, the common unit further comprising means for detecting errors in framing bits and providing a frame slip alarm where a cluster of errors is detected.

7. A system as claimed in claim 4, the common unit further comprising a register for storing data from the digital communications line during selected time slots.

8. A system as claimed in claim 4, the common unit comprising separate transmission and receive registers for respectively storing data transmitted from the channel units and data received from the digital communications line.

9. A system as claimed in claim 4 wherein insert data received from the controller through a control bus is provided at a rate slower than the rate at which frames of time multiplexed data are transferred on the digital communications line, and other insert data is provided separately from the control bus at the frame rate to provide test tones as insert data.

10. A system as claimed in claim 4 wherein the common unit is a modular unit.

11. A system as claimed in claim 4 wherein the processor of the voice signal channel module is able to signal a transmit module such that the transmit module selects digital signals from the channel unit to be transferred to the common module.

12. A system as claimed in claim 4 wherein the processor is able to control loop back of voice signals in response to signals from the controller.

13. A common module for incorporation into a modular digital terminal for coupling a time multiplexed digital communications line to a plurality of secondary lines including voice signal lines, the terminal further comprising a plurality of voice signal channel modules for converting signals in individual time slots to voice signals on the voice lines, the common unit module further comprising:
  means for identifying time slots of frames of digital information received on the digital communications line; and
  means for inserting digital information in selected time slots on the digital communications link for communicating with voice signal channel modules to set operating parameters of the channel modules.

14. A common module as claimed in claim 13 wherein the digital information includes framing bits, the common module further comprising means for counting errors in framing bits received in the digital signal.

15. A common module as claimed in claim 13 wherein the digital information includes framing bits, the common module further comprising means for detecting errors in framing bits and providing an alarm where a cluster of errors is detected.

16. A common module as claimed in claim 13 further comprising a register for storing data from the digital communications line during selected time slots.

17. A common module as claimed in claim 13 comprising separate transmission and receive registers for respectively storing data transmitted from the channel units and data received from the digital communications line.

18. A common module as claimed in claim 13 wherein insert data is received from a controller through a control bus at a rate slower than the rate at which frames of time multiplexed data are transferred on the digital communications line, and other insert data is provided separately from the control bus at the frame rate to provide test tones as insert data.

19. A channel unit module for incorporation into a modular digital terminal for coupling a time multiplexed digital communications line to a plurality of secondary lines including voice signal lines, the terminal including means for converting between digital signals received on the digital communications line and pulse amplitude modulated signals, the channel module comprising:
  means for converting between pulse amplitude modulated signals in individual time slots and voice signals on the voice signal lines; and
  means for receiving the digital signals corresponding to the pulse amplitude modulated signals and for setting analog operating parameters of the channel unit in response to the digital signals.

20. A channel unit as claimed in claim 19 further comprising means for signaling a transmit unit to select a digital data from the channel unit or select a pulse amplitude modulated signal for conversion to digital data for transmission to the digital communications line.

21. A channel unit as claimed in claim 19 wherein the means for receiving the digital signals comprises a state machine for responding only to predetermined sequences of data.

22. A channel unit as claimed in claim 17 further comprising means for initially transmitting a start-up code to a common unit when the channel unit is initially installed in the terminal.

23. A modular digital terminal for coupling a time multiplexed digital communications line to a plurality of secondary lines including voice signal lines, the terminal including a digital common module, receive and transmit units for defining time slots for received and transmitted pulse code modulated (PCM) information on the digital line and for converting between PCM signals and pulse amplitude modulated (PAM) signals, and a plurality of voice signal channel modules for converting between PAM signals in individual time slots and voice signals on the voice signal lines:
  the common module comprising means for defining time slots for received and transmitted PCM information on the digital line, a source of PCM insert data to be inserted onto the digital communications line or to be transferred to the channel modules in predetermined time slots, a receive multiplexer for selecting, during each time slot, between PCM data received on the communications line and PCM insert data to be transferred to the receive unit and channel modules, a transmit multiplexer for selecting, during each time slot, between PCM data received from the transmit unit and PCM insert data to be transferred to the digital communications line, a receive data register for storing PCM data received from the digital communications line and a transmit data register for storing PCM data from the transmit unit;

each of plural voice signal channel modules comprising a processor for receiving PCM insert data from the common module to set operating parameters of the channel unit and for transmitting PCM data to the common module transmit data register; and the system further comprising a controller for receiving data from the receive data register and transmit data register and for providing insert data to test and set the operating parameters of the voice signal channel modules.

24. A terminal as claimed in claim 23 further comprising means for selecting an individual time slot from which data is stored in the receive data register or transmit data register.

25. A terminal as claimed in claim 23 wherein insert data received from the controller through a control bus is provided at a rate slower than the rate at which frames of time multiplexed data and transferred on the digital communications line, and other insert data is provided separately from the control bus at the frame rate to provide test tones as insert data.

26. A terminal as claimed in claim 23 wherein the processor of the voice signal channel module is able to signal the transmit unit to select PCM signals from the channel unit to be transferred to the common module transmit data register.

27. A method of setting operating parameters of a channel unit in a modular digital terminal for coupling a time multiplexed digital communications line to a plurality of secondary lines, the terminal including a plurality of voice signal responsive channel modules and means for converting between digital data on the digital line and voice signals at the channel modules, the method comprising:

providing the digital data to the voice signal channel units along with the corresponding voice signals;

inserting digital data on the communication line in a time slot corresponding to the voice signal channel unit; and responding in the channel unit to the insert data to set operating parameters of the voice signal channel unit.

28. A method as claimed in claim 27 wherein the digital insert data is applied to the digital communications line and is transmitted to a remote terminal to set the parameters of a remote channel unit.

29. A method as claimed in claim 27 wherein digital data corresponding to a tone is inserted onto the digital communication line.

30. A method as claimed in claim 29 further comprising applying the inserted digital data corresponding to a tone to a network customer terminating equipment unit and setting the parameters of the channel unit based on the signal returned from the network customer terminating equipment unit.

31. A method as claimed in claim 29 wherein insert data received from a controller through a control bus is provided at a rate slower than the rate at which frames of time multiplexed data are transferred on the digital communications line, and other insert data is provided separately from the control bus at the frame rate to provide test tones as insert data.

* * * * *